United States Patent
Brognara et al.

(10) Patent No.: US 7,058,787 B2
(45) Date of Patent: Jun. 6, 2006

(54) METHOD AND CIRCUIT FOR GENERATING MEMORY ADDRESSES FOR A MEMORY BUFFER

(75) Inventors: Fabio Brognara, Darfo Boario Terme (IT); Marco Ferretti, Pavia (IT); Mauro De Ponti, Seregno (IT); Vittorio Peduto, Ivrea (IT)

(73) Assignee: STMicroelectronics S.r.l., Agrate Brianza (IL)

( * ) Notice: Subject to any disclaimer, the term of this patent is extended or adjusted under 35 U.S.C. 154(b) by 518 days.

(21) Appl. No.: 10/429,942

(22) Filed: May 5, 2003

(65) Prior Publication Data
US 2004/0225861 A1    Nov. 11, 2004

(51) Int. Cl.
*G06F 12/02* (2006.01)
(52) U.S. Cl. ................... 711/217; 365/230.08
(58) Field of Classification Search ............ None
See application file for complete search history.

(56) References Cited

U.S. PATENT DOCUMENTS

| | | | | |
|---|---|---|---|---|
| 5,898,393 | A * | 4/1999 | Werner | 341/55 |
| 5,970,221 | A * | 10/1999 | Bolash et al. | 358/1.16 |
| 6,925,563 | B1 * | 8/2005 | Jennings | 713/174 |
| 2003/0206628 | A1 * | 11/2003 | Gura et al. | 380/28 |

FOREIGN PATENT DOCUMENTS

EP    0497493    8/1992

\* cited by examiner

*Primary Examiner*—Kevin Verbrugge
(74) *Attorney, Agent, or Firm*—Lisa K. Jorgenson; Allen, Dyer, Doppelt, Milbrath & Gilchrist, P.A.

(57) ABSTRACT

A method for generating sequences of memory addresses for a memory buffer having N*M locations includes making a first address and a last address of every sequence respectively equal to 0 and to N*M−1, assigning a first sequence of addresses, and each address but a last address of another sequence of addresses is generated by multiplying a corresponding address of a previous sequence by N, and performing a modular reduction of this product with respect to N*M−1. The method further includes calculating a greatest bit length of every address, and calculating an auxiliary constant as the modular reduction with respect to N*M−1 of the power of two raised to twice the greatest bit length. Each sequence of addresses includes storing an auxiliary parameter equal to an $N+1^{th}$ address of the current sequence, computing a first factor as the modular product with respect to N*M−1 of the auxiliary constant based upon a ratio between the auxiliary parameter and the power of two raised to the greatest bit length, and generating all addresses but the last of a sequence by performing the Montgomery algorithm using the first factor and an address index varying from 0 to N*M−2 as factors of the Montgomery algorithm, and with the quantity N*M−1 as modulus of the Montgomery algorithm, and the greatest bit length as the number of iterations of the Montgomery algorithm.

13 Claims, 9 Drawing Sheets

METHOD AND CIRCUIT FOR GENERATING MEMORY ADDRESSES FOR A MEMORY BUFFER

FIELD OF THE INVENTION

The present invention relates to interfaces, and in particular, to a method and a circuit for generating sequences of memory addresses for a memory buffer.

BACKGROUND OF THE INVENTION

In certain applications, such as in printers, it is necessary to write data in a particular order that does not coincide with the order in which the data is stored in a memory. For example, data written in rows of a memory buffer (or in columns) is to be sent to the printer in columns (or in rows).

This is generally done by the use of so-called swath buffers. Swath buffers function as interfaces receiving data to be printed from the memory where the data is stored, and sends the data to a printer in the desired order. A swath buffer may be formed with a pair of memory buffers. Input data is written in rows in a first buffer, and a second buffer is for outputting the data. The second buffer copies the data to be output after reading the first buffer in columns, and arranges the data in the desired printing order.

This technique is burdensome both in terms of silicon area being occupied because it requires the use of two buffers, and in terms of time because the first buffer may be rewritten with new data only after all data stored in it has been copied in the second buffer.

A more convenient approach includes using only a single memory buffer and writing new data in the memory location of the just read data. This technique requires the use of a single memory buffer, but the addresses in which data is to be read and written are to be generated according to a certain sequence based on modular multiplications.

To illustrate how these addresses are generated, the following basic example will be considered. In a memory buffer of 3 rows and 2 columns, data A1, ..., C2 intended for a printer swath process are initially written in a customary row order in the memory locations from 0 to 5:

| 0  | 1  |
|----|----|
| A1 | A2 |
| 2  | 3  |
| B1 | B2 |
| 4  | 5  |
| C1 | C2 |

A printer swath is obtained by reading data from the buffer by columns, and according to the cited technique, the just read data is overwritten with new data for a successive printer swath. The following table illustrates the read and write sequence:

| Read    | A1 | B1 | C1 | A2 | B2 | C2 |
|---------|----|----|----|----|----|----|
| Address | 0  | 2  | 4  | 1  | 3  | 5  |
| Write   | D1 | D2 | E1 | E2 | F1 | F2 |

After having written the data of a second swath, the data is read in the appropriate sequence and the same memory locations are immediately rewritten with data for a third swath G1, ..., T2:

| Read    | D1 | E1 | F1 | D2 | E2 | F2 |
|---------|----|----|----|----|----|----|
| Address | 0  | 4  | 3  | 2  | 1  | 5  |
| Write   | G1 | G2 | H1 | H2 | I1 | I2 |

It is evident that the fourth (J1, ..., L2) and fifth swaths (M1, ..., O2) are read and written as shown in the following tables:

| Read    | G1 | H1 | I1 | G2 | H2 | I2 |
|---------|----|----|----|----|----|----|
| Address | 0  | 3  | 1  | 4  | 2  | 5  |
| Write   | J1 | J2 | K1 | K2 | L1 | L2 | and

| Read    | J1 | K1 | L1 | J2 | K2 | L2 |
|---------|----|----|----|----|----|----|
| Address | 0  | 1  | 2  | 3  | 4  | 5  |
| Write   | M1 | M2 | N1 | N2 | O1 | O2 |

As may be noticed, the data for the fifth printer swath is written in the same order as the data of the first swath. Therefore, this technique may be implemented by generating for each printer swath an appropriate sequence of memory addresses. These addresses may be calculated by noting that the first location (0) and the last location (5) are to always be read first and last, respectively, while addresses of the other locations are calculated by multiplying each address but the last by the number of columns (two), and by performing a modular reduction of the result with respect to five, which is the address of the last location.

In general, for a memory buffer of M rows and N columns, the recursive formula for calculating the address $\zeta(s+1)$ at step $s+1$ is $$\zeta(s+1) = (N \cdot \zeta(s)) \bmod (N \cdot M - 1) \qquad (1)$$

The system described in the European patent 497,493 has address generation based on the above algorithm. The above modular operation is performed in two separate steps: the multiplication first followed by the modular reduction.

This approach is burdensome from the point of view of the number of required computations. In fact, a multiplication circuit, if formed by combining devices, requires without optimization a number of n bit adders equal to n*m, wherein n and m are the number of bits of each factor, with $n \geq m$. This multiplication may last several clock pulses if implemented in a sequential mode.

Even if the modular reduction was performed by the Barrett algorithm, it would need divisions and multiplications lasting a relatively large number of clock pulses. Reference is directed to A. Memezes, P. van Oorschot and S. Vanstone, "Handbook of Applied Cryptography", CRC Press, downloadable from the website http://www.cacr.math.uwaterloo.ca/hac, for additional information. Therefore, the system of the above noted European patent is very straightforward to form but is not very efficient because the time required for generating a buffer address is relatively long. There is thus a need for a relatively faster circuit for generating addresses for a swath buffer.

SUMMARY OF THE INVENTION

In view of the foregoing background, an object of the present invention is to provide a fast method for generating sequences of memory addresses for a swath buffer. The method of this invention employs the Montgomery algorithm for performing modular multiplications.

This and other objects, advantages and features in accordance with the present invention are provided by a for generating sequences of memory addresses for a memory buffer having N*M locations, comprising making the first address and the last address of every sequence respectively equal to 0 and to N*M−1, and assigning a first sequence of addresses Each address but the last of a successive sequence of addresses is generated by multiplying a corresponding address of the previous sequences by N, and performing a modular reduction of this product with respect to N*M−1.

Generation of memory addresses is faster than the prior art methods because it is performed based upon the following operations comprising preliminarily calculating the greatest bit length of every address, and calculating an auxiliary constant as the modular reduction with respect to N*M−1 of the power of two raised to twice the greatest bit length. For each sequence of addresses the following operations are performed: storing an auxiliary parameter equal to the N+1$^{th}$ address of the current sequence; computing a first factor as the modular product with respect to N*M−1 of the auxiliary constant by the ratio between the auxiliary parameter and the power of two raised to the greatest bit length; and generating all addresses but the last of a sequence by performing the Montgomery algorithm using a first factor and an address index varying from 0 to N*M−2 as factors of the algorithm, the quantity N*M−1 as modulus of the algorithm, and the greatest bit length as the number of iterations of the algorithm.

The method of the invention may be implemented in an address generating circuit for a memory buffer having at least a pipeline of adders and registers for performing the above illustrated Montgomery algorithm.

BRIEF DESCRIPTION OF THE DRAWINGS

The different aspects and advantages of the invention will appear even more evident through a detailed description referring to the attached drawings, wherein.

DETAILED DESCRIPTION OF THE PREFERRED EMBODIMENTS

Figure 1:
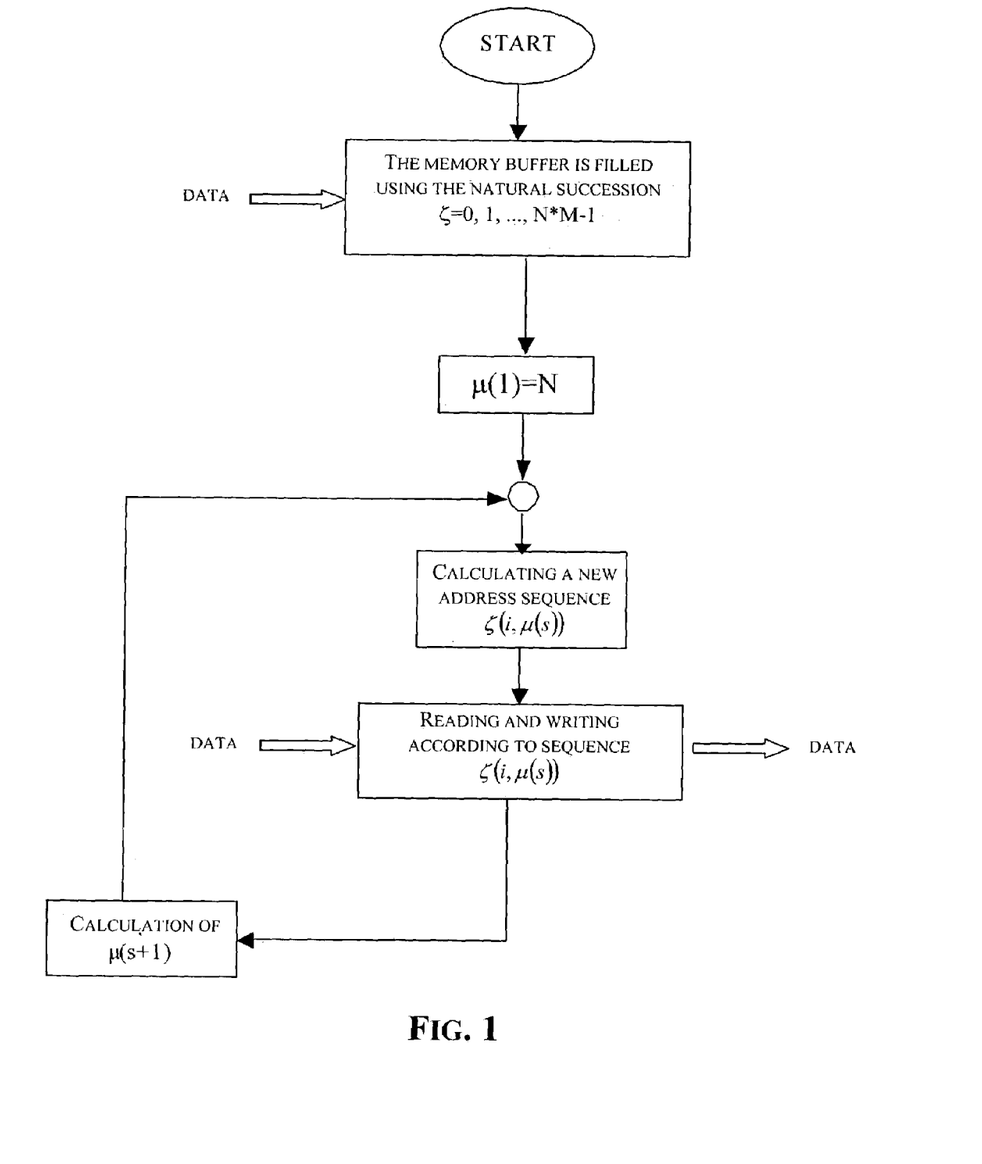
FIG. 1 is a basic flow chart illustrating a method in accordance with the present invention.

According to the method of the invention, the sequence of addresses is obtained with an iterative algorithm that uses an auxiliary parameter μ(s), which is updated at each iteration. A basic flow chart of the method of the invention is depicted in FIG. 1. The initial address sequence is the natural succession 0, 1, . . . , N*M−1 and the auxiliary parameter is set to N:

$$\mu(1)=N$$

A new sequence of addresses is calculated and data for the printer swaths are read from and written in the memory buffer. A new value of the auxiliary parameter μ(s+1) is calculated and is used for calculating the next address sequence.

The address sequence ζ(s) is calculated at step s using the value of the auxiliary parameter at step s according to the following equation:

$$\zeta(i, \mu(s))=(i\cdot\mu(s))\bmod(N\cdot M-1) \qquad (2)$$

wherein i=0, 1, . . . , N*M−2. As previously stated, the address of the last memory location N*M−1 is always the last address of every sequence:

$$\zeta(N\cdot M-1, \mu(s))=N\cdot M-1 \qquad (3)$$

The successive value of the auxiliary parameter is given by the following equation:

$$\mu(s+1)=(N\cdot\mu(s))\bmod(N\cdot M-1) \qquad (4)$$

that is equal to the address calculated for i=N:

$$\zeta(N, \mu(s))=(N\cdot\mu(s))\bmod(N\cdot M-1)=\mu(s+1) \qquad (5)$$

The value of the auxiliary parameter μ(s+1) may be simply obtained by storing the N+1$^{th}$ generated address (i=N). To speed up the calculation of a sequence of addresses, the modular multiplications are performed using the Montgomery algorithm.

The Montgomery algorithm, for numbers represented in binary form, is defined as follows. Given three binary numbers of n ciphers K=(k$_{n-1}$k$_{n-2}$ . . . k$_1$k$_0$)$_2$, X=(x$_{n-1}$x$_{n-2}$ . . . x$^1$x$_0$)$_2$, Y=(y$_{n-1}$y$_{n-2}$ . . . y$_{1y0}$)$_2$ with 0≦X, Y≦K, R=2$^n$, and K is an odd number, the algorithm is defined by the following steps:

Basic Version
1. A=0; (with A=(a$_{n-1}$a$_{n-2}$ . . . a$_1$a$_0$)$_2$)
2. FOR j=0 TO n−1
   u$_j$: =(a$_0$+x$_j$y$_0$) mod 2;
   A: =(A+x$_j$Y+u$_j$K)/2
3. IF A≧K THEN A: =A−K;

The result is A=(X*Y*R$^{-1}$) mod K. This algorithm is formed by repeated sums and multiplications of a number by a bit and divisions by the representation base (which is 2) of the numbers. These divisions may be simply performed discarding the least significant bit, or also shifting right the content a shift register. The products of a number by a bit are not carried out, because the result is the number itself or is 0 whether the bit is 1 or 0, respectively.

It is worth noting that the Montgomery algorithm outputs the quantity (X*Y*R$^{-1}$) mod K. Therefore, in order to obtain the desired result (X*Y)mod K, it is necessary to carry out the following operations: calculating the quantity PRE_COMP=R$^2$mod K; applying the Montgomery algorithm to PRE_COMP and to one of the factors to be multiplied, for example X, for calculating another value Z=(PRE_

COMP*X*R$^{-1}$) mod K; and applying the Montgomery algorithm to Z and Y, obtaining (R$^2$*X*R$^{-1}$*Y*R$^{-1}$) mod K=(X*Y)mod K, which is the desired result.

By resuming in accordance with the method of the invention, addresses of a sequence are generated as follows: for s=0, the sequence of addresses is equal to the natural succession going from 0 to N*M−1 output by a counter; the greatest bit length N_BIT of addresses is calculated; the value PRE_COMP=R$^2$mod(N*M−1) is calculated, with R=2$^{N\_BIT}$; when the address index i=N, the corresponding address ζ(N,μ(s)) is the value of μ(s+1), that is stored; a first factor ν of the Montgomery algorithm is calculated according to the following formula ν=(PRE_COMP*μ(S+1)*R$^{-1}$)mod (MAX) for performing the Montgomery algorithm on the factors ν and the address index i, obtaining the desired modular product between the address index i and the auxiliary factor, according to equation (2).

There is a particular way of carrying out the Montgomery algorithm that is very straightforward to implement by a hardware circuit. The Montgomery algorithm, for binary strings, is equivalent to the following:

Second Version

```
1. A = 0;
2. FOR j = 0 TO n−1
    IF x_j = 1 THEN u_j: = (a_0+y_0) mod 2;
        IF u_j = 1 THEN A: = (A+Y+K);
        ELSE A: = (A+Y);
    ELSE u_j: = a_0;
        IF u_j == 1 THEN A: = (A+K); A: = A/2;
3. IF A ≧ K THEN A: = A−K;
```

The result is A=(X*Y*R$^{-1}$) mod K. This sequence of nested IF . . . THEN cycles may be simplified by introducing another variable W=(w$_{n-1}$w$_{n-2}$ . . . w$_1$w$_0$)$_2$:

Third Version

```
1. A=0;
2. FOR j=0 TO n−1
    IF x_j = 1 THEN W: = (A+Y);
    ELSE W: = A;
    IF w_0 = 1 THEN A:=(W+K);
    ELSE A:=W; A:=A/2;
3. IF A ≧ K THEN A: = A−K;
```

The result is A=(X*Y*R$^{-1}$) mod K. This last sequence of operations may be easily implemented using only adders and multiplexers, as will be explained below.

For better understanding the invention, the following example will be considered in which the addresses to be generated belong to the interval [0, 19660799]. The bit length N_BIT of the greatest address, which is also the number of iterations of the Montgomery algorithm, is N_BIT={log$_2$ 19660799}=25 wherein the operation {log$_2$ 19660799} returns the smallest integer greater than its argument.

Each iteration of the algorithm requires at least 2 sums plus a bit comparison and a shift. The shift operation may be performed simply by inputting the adder that should carry out the sum after the shift operation with all the bits but the least significant bit of the bit string A, thus realizing in an implicit mode the shift operation. Therefore, each iteration of the Montgomery algorithm (the operations in the FOR cycle) lasts the time needed for performing two sums.

The computing cost is 2*N_BIT=2*25=50 plus a final comparison and a subtraction. Therefore the computing cost of the Montgomery algorithm is about 50+2=52 times the time required for performing a single sum. The quantity PRE_COMP=R$^2$mod(MAX) is calculated only once, thus its computing cost is independent from the number N_BIT of bits.

The method of the invention may be implemented in an address generating circuit for a memory buffer having N*M locations. Such an address generating circuit may be used for generating addresses in a swath buffer interface with a single memory buffer.

Figure 2:
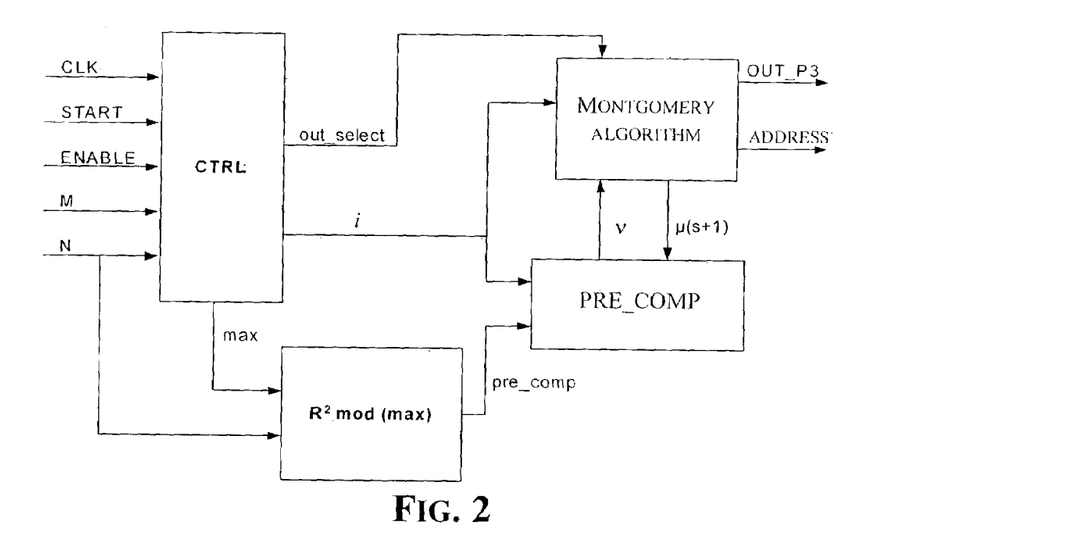
FIG. 2 is an embodiment of an address generating circuit for a synchronous memory access in accordance with the present invention.
Figure 3:
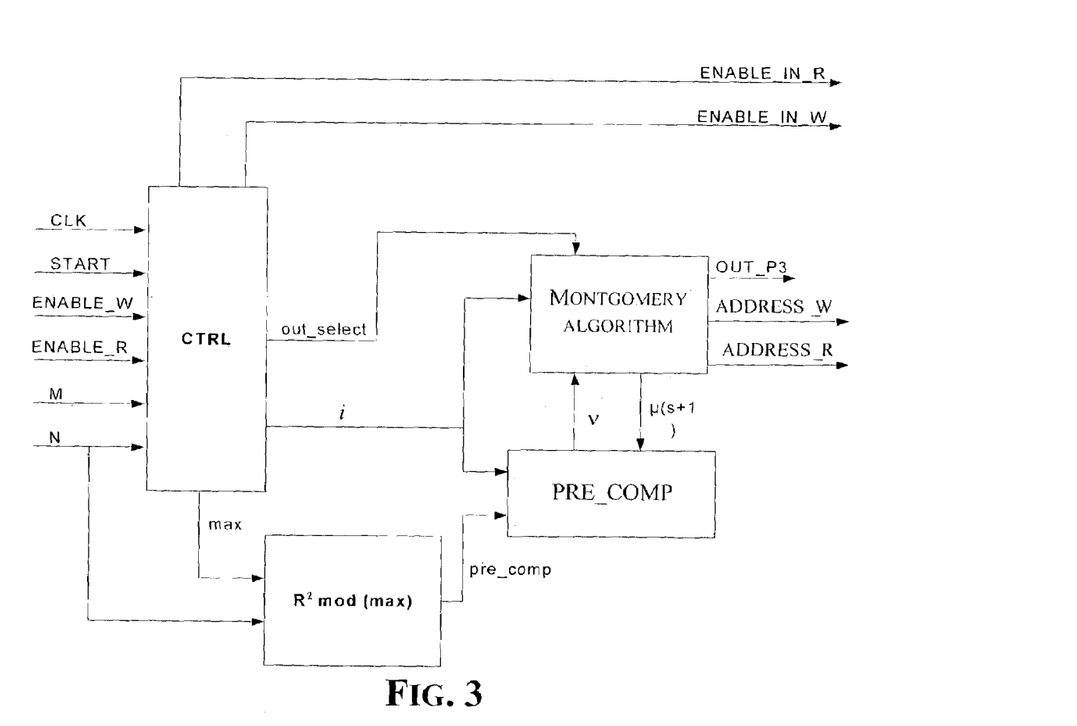
FIG. 3 is an embodiment of an address generating circuit for an asynchronous memory access in accordance with the present invention.

Two block diagrams of two embodiments of an address generating circuit of the invention for synchronous and asynchronous read and write operations are respectively depicted in FIGS. 2 and 3. The input data and signals are the width N and the height M of the memory buffer in which data are to be written and read; at least an enable signal ENABLE for enabling read and write operations; a start signal START for resetting the registers and starting the algorithm; and a clock signal CLK.

Preferably there are two enable signals ENABLE_W and ENABLE_R for enabling the generation of read or write addresses for asynchronous operations. The outputs are a memory address ADDRESS, at which to read or write data, and a selection bit OUT_P3.

The circuit of the invention may output two memory addresses ADDRESS_W and ADDRESS_R at which to write and to read data, respectively, and two output enabling signals ENABLE_IN_W and ENABLE_IN_R for communicating to the memory whether enabling or disabling a write or a read operation. This is required when the read and write operations are not synchronous and are to be performed independently.

The input data N and M are stored into two respective configuration registers that are updated by a leading edge of the signal START. Given that the Montgomery algorithm needs the divider N*M−1 to be odd, then N or M must be even. In the ensuing description reference will be made to the embodiment of FIG. 3, but the same considerations apply to the circuit for synchronous read and write operations of FIG. 2.

Essentially, a circuit of the invention comprises the following items. A controller CTRL calculates the value MAX=N*M−1, governs the execution of the Montgomery algorithm (index i), generates the output enable signals ENABLE_IN_R and ENABLE_IN_W and an internal selection bit OUT_SELECT, whose function will be explained below, for outputting the correct address for a read operation ADDRESS_R or a write operation ADDRESS_W. A circuit block R$^2$mod(MAX) generates a signal PRE-COMP representing the value R$^2$mod(MAX) used in the Montgomery algorithm. A second circuit block PRE_COMP calculates the previously mentioned parameter ν used in the Montgomery algorithm according to the method of the invention. A third circuit block MONTGOMERY ALGORITHM outputs memory addresses ADDRESS_W and ADDRESS_R for performing asynchronous write or read operations, and a bit OUT_P3 that corresponds to the selection bit OUT_SELECT propagated to the last stage of the pipeline.

Figure 4:
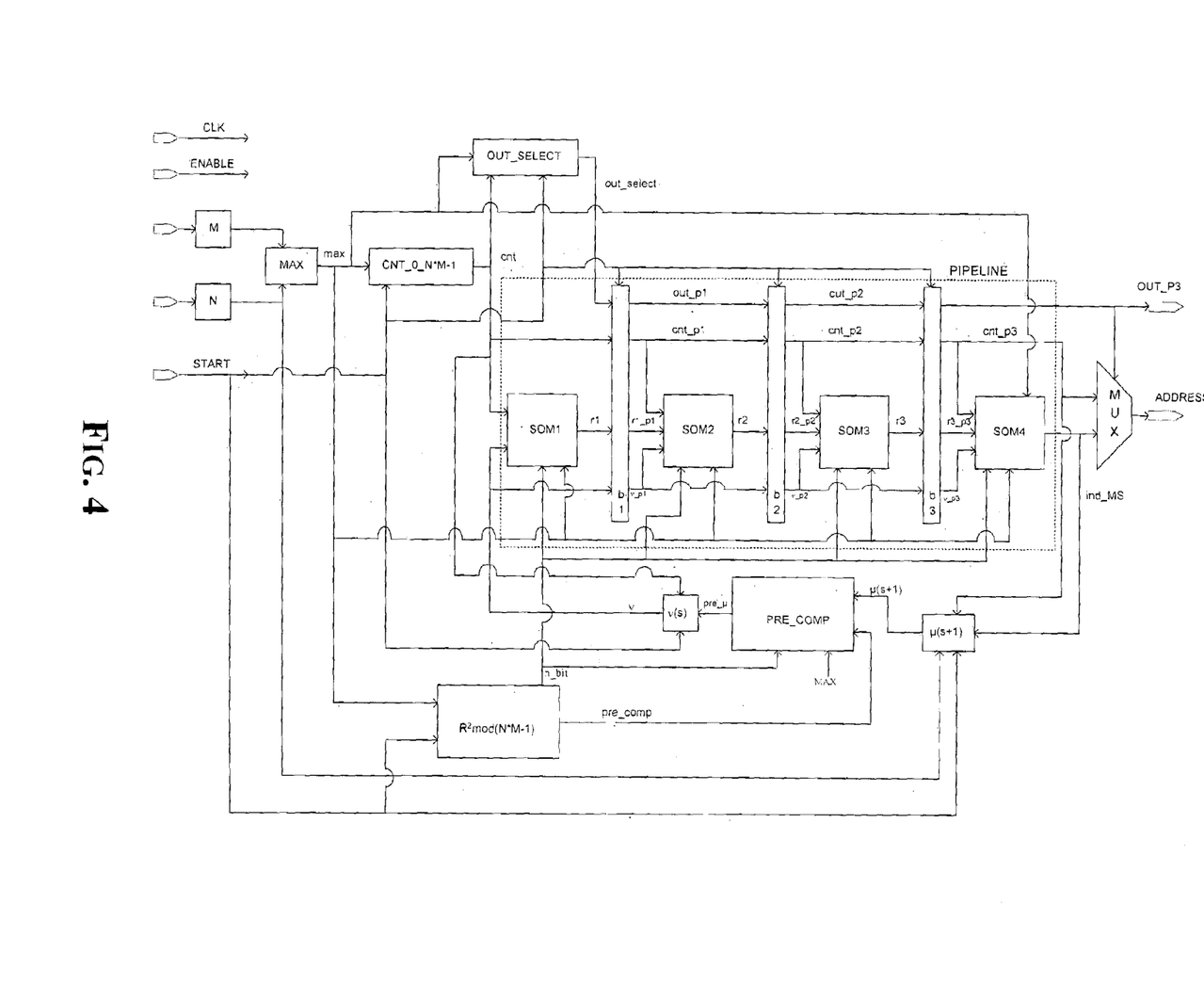
FIG. 4 is a detailed scheme of the address generating circuit of FIG. 2.
Figure 5:
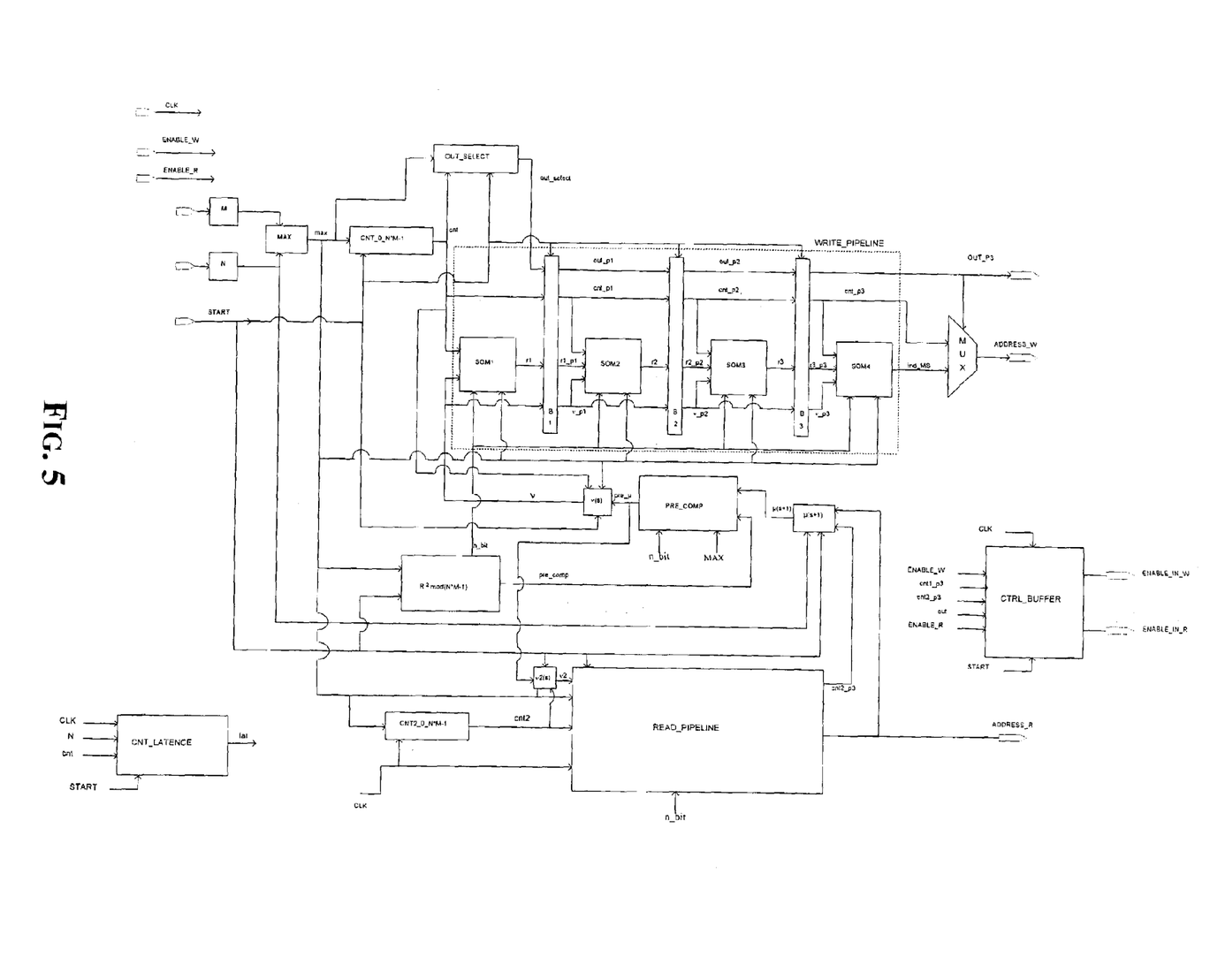
FIG. 5 is a detailed scheme of the address generating circuit of FIG. 3.

A detailed scheme of embodiments of the invention for the swath buffers of FIGS. 2 and 3 implementing the Third Version of the Montgomery algorithm are respectively depicted in FIGS. 4 and 5.

The address generating circuit of the invention preferably has two identical pipelines, a read pipeline READ_PIPE- LINE and a write pipeline WRITE_PIPELINE. A sample architecture of the latter is depicted in detail. Each pipeline has four sub-circuits SOM1, SOM2, SOM3 and SOM4 comprising 13 adders each and as many multiplexers separated by buffer registers B1, B2 and B3.

Optionally, the pipelines may be formed by any number of sub-circuits in cascade separated by buffer registers, or even by a single circuit carrying out a single cycle of the Montgomery algorithm at the time. A large number of sub-circuits of the pipelines causes execution of the algorithm to be faster, while a small number of sub-circuits allows a reduction of silicon area consumption.

Figure 8:
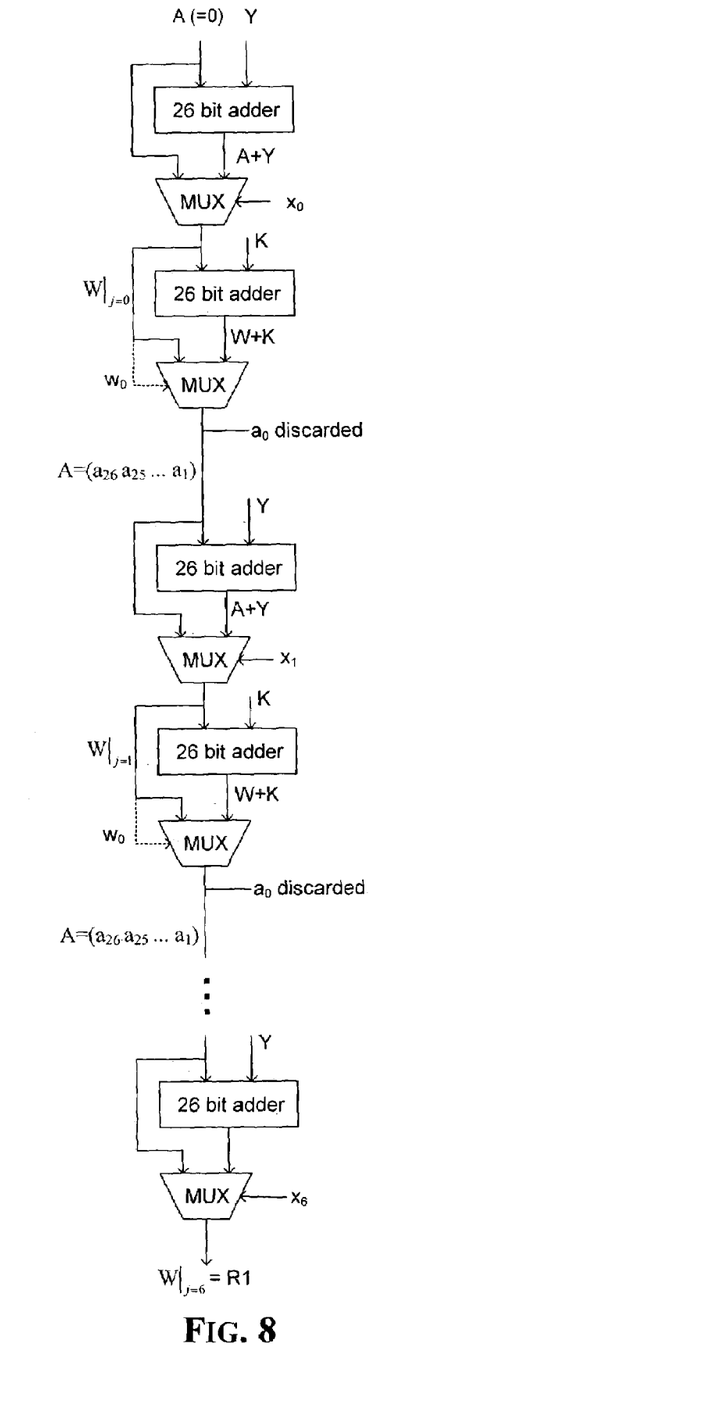
FIG. 8 shows how adders are coupled to perform the shift and sum operations performed by the Montgomery algorithm in accordance with the present invention.

Each sub-circuit of the pipeline has a structure of a cascade of adders and multiplexers, as depicted in FIG. 8, and carries out a certain number of operations of the FOR cycle of the Third Version of the algorithm.

The following TABLE 1 describes the signals in FIG. 5.

TABLE 1

| Signal | Meaning |
| --- | --- |
| MAX | Maximum reference value. |
| CNT | Counter output for timing the steps of the algorithm for the pipeline that generates write addresses. |
| CNT2 | Counter output for timing the steps of the algorithm for the pipeline that generates read addresses. |
| CNT_P1 | Index of algorithm step propagated to the second pipeline stage. |
| CNT_P2 | Index of algorithm step propagated to the third pipeline stage. |
| CNT_P3 | Index of algorithm step propagated to the fourth pipeline stage. |
| OUT_SELECT | Selection bit of the multiplexer that outputs the write address ADDRESS_W. |
| OUT_P1 | Selection bit propagated to the second pipeline stage. |
| OUT_P2 | Selection bit propagated to the third pipeline stage. |
| OUT_P3 | Selection bit propagated to the output multiplexer MUX. |
| R1 | Output of the first array of adders of the pipeline. |
| R1_P1 | Input of the second array of adders of the pipeline. |
| R2 | Output of the second array of adders of the pipeline. |
| R2_P2 | Input of the third array of adders of the pipeline. |
| R3 | Output of the third array of adders of the pipeline. |
| R3_P3 | Input of the fourth array of adders of the pipeline. |
| IND_MS | Address generated according to the algorithm by the pipeline WRITE_PIPELINE. |
| v | Input value of the first array of adders; it is equal to PRE_μ or to 1. |
| v_P1 | Bits of parameter v used by the second array of adders. |
| v_P2 | Bits of parameter v used by the third array of adders. |
| v_P3 | Bits of parameter v used by the fourth array of adders. |
| v2 | Input value of the pipeline READ_PIPELINE equal to the parameter v. |
| μ (s + 1) | Next value of the auxiliary parameter μ. |
| PRE_μ | Next value of μ with pre-computing; it corresponds to $(PRE\_COMP * \mu(s+1) * R^{-1}) \mod (MAX)$. |
| PRE_COMP | Parameter necessary for calculating PRE_μ; it is equal to $R^2 \mod(N * M - 1)$. |
| N_BIT | Number of bits of MAX. |
| LAT | Logic signal for letting the pipeline READ_PIPELINE eliminate the latency. |

As previously stated, the last address of every address sequence must be the address of the last memory location N*M−1. Therefore, when the address index i is equal to the value MAX, that is, when the counter value CNT_P3 propagated to the last stage SOM4 is equal to MAX, the last block SOM4 must output the value MAX.

The selection bit OUT_SELECT is null during the generation of the first sequence of addresses. When the counter reaches the end count value (MAX), the selection bit switches active and remains active as long as a new signal START is generated. The output multiplexer MUX, which is input with the signal CNT_P3 and the address calculated by the Montgomery algorithm, respectively selects the value of CNT_P3 or the other input when the bit OUT_P3 is null or active. In this way, the first sequence of addresses is the natural succession, while other address sequences are formed by the addresses calculated by the Montgomery algorithm.

For each circuit block of FIG. 5 a brief description is given below.

Block MAX:
inputs: N, M
output: MAX

Figure 6:
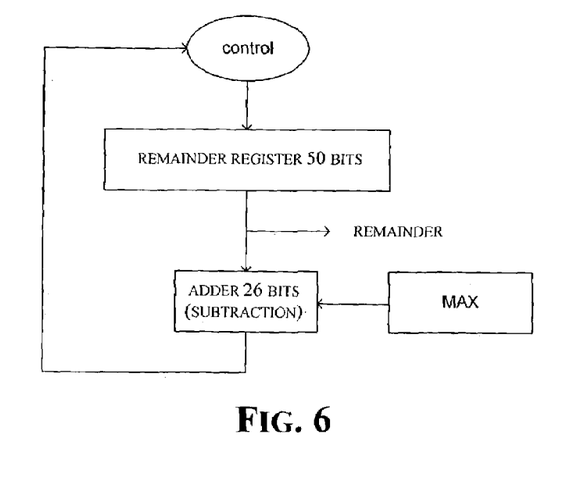
FIG. 6 is a block diagram of the state machine R$^2$mod (N*M−1) of FIGS. 4 and 5.
Figure 7:
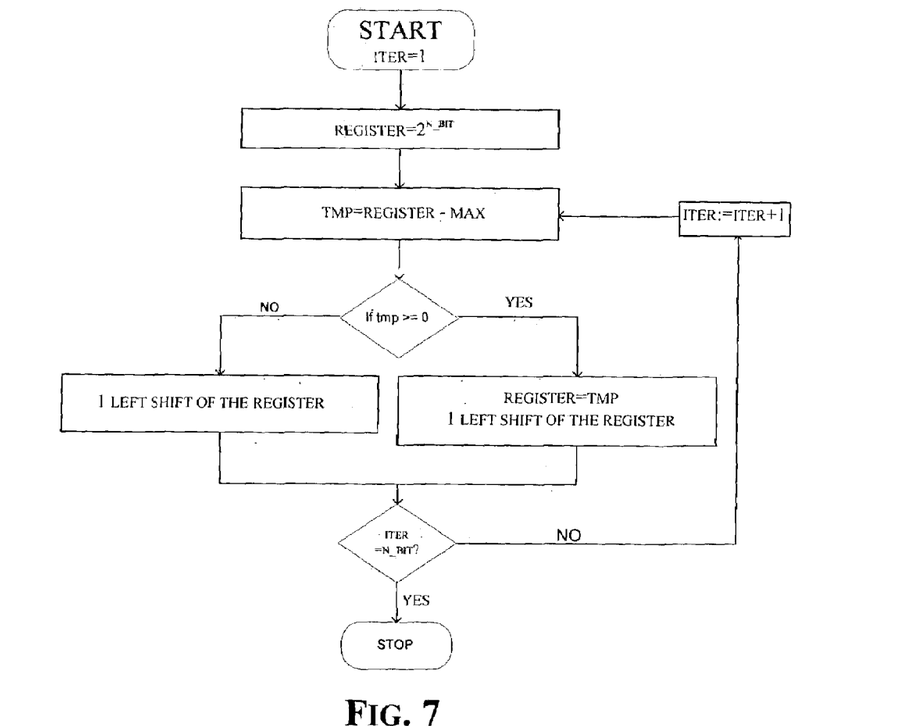
FIG. 7 is a flow chart of the operations to be performed by the state machine R$^2$mod(N*M−1) of FIGS. 4 and 5.

It is a combinatory circuit calculating N*M−1 wherein N and M are the width and height of the memory buffer. These values are taken from respective configuration registers.
Counter CNT 0 . . . N*M−1:
inputs: CLK, START, MAX, ENABLE_IN_W
output: CNT It is a counter from 0 to N*M−1 for generating the necessary succession of address indexes. When the signal START is 1, the counter is set to 3, and when the maximum counting is reached (which is the value MAX) the counter restarts from 0.
Block $R^2 \mod(N*M-1)$:
inputs: START, MAX, CLK
outputs: N_BIT, PRE_COMP The signals N_BIT, which represents the number of bits of N*M−1, and PRE_COMP, which is the result of the operation $R^2 \mod(MAX)$, wherein $R=2^{N_{BIT}}$, are generated. This operation is carried out by a state machine for calculating the remainder of the division formed by a register whose bit length is N+M (16+10=26 in the depicted case) and by an adder that generates the difference between the remainder and the value MAX. FIGS. 6 and 7 illustrate a block diagram of the state machine and the flow chart of operations to be carried out.

Preliminarily, the value of N_BIT is calculated, then the register is loaded with the value $2^{N\_BIT}$. The difference between the value of the register and the value MAX is calculated. Should the result be greater or equal to 0, the content of the register is updated with this result, then it is multiplied by 2, which corresponds to a left shift of the register. Finally, if the number of iterations ITER of this algorithm is smaller than N_BIT, the register stores the desired value, otherwise another iteration is performed.

For better understanding the algorithm performed by this block, a very straightforward application of it to the case in which MAX=9 (that is N_BIT=4) is given below:

```
ITER=1;
  REGISTER=2⁴;
  TMP=2⁴−9=7>0;
  REGISTER=7; REGISTER=2*7=14 (1 left shift);
  ITER<4;
ITER=2;
```

-continued

```
    TMP=14−9=5>0;
    REGISTER=5; REGISTER=2*5=10 (1 left shift);
    ITER<4;
ITER=3;
    TMP=10−9=1>0;
    REGTSTER=1; REGISTER=2*1=2 (1 left shift);
    ITER<4;
ITER=4;
    TMP=2−9=−7<0;
    REGISTER=4 (1 left shift);
REMAINDER=4;
```

In the worst case, that is when MAX has 25 bits, the computation of the remainder requires 26 clock pulses. Therefore, if the circuit PRE_COMP needs 4 clock pulses, after 30 clock periods the signal PRE_μ is output.

Register μ(s+1)
inputs: ADDRESS_R, N, START, CLK, CNT2_P3
output: μ(s+1)

It is a 25 bits register storing the value ADDRESS_R when the signal CNT2_P3 is equal to N, according to equation (4). The signal START sets the register to the value N, which represents the value of μ(1) of the algorithm.

Block PRE_COMP:
inputs: PRE_COMP, μ(s+1), N_BIT, MAX
output: PRE_μ

It computes a factor of the Montgomery algorithm: PRE_μ=(PRE_COMP*μ(s+1)*$R^{-1}$) mod (N*M−1).

This pre-computing stage is necessary for calculating addresses using the Montgomery algorithm that, as stated before, outputs the quantity (X*Y*$R^{-1}$) mod K, with X and Y being two factors to be multiplied, and not the desired quantity (X*Y) mod K. The signal PRE_μ is obtained by performing the Montgomery algorithm with factors PRE_COMP and μ(s+1) using a cascade of 52 adders. Given that this preliminary computing is performed only once, it is not convenient to speed up the generation of the output using a pipeline structure, which is area consuming. The generation of this output takes longer, but a relatively large silicon area is saved.

Block v(s):
inputs: PRE_μ, MAX, CNT, START, CLK
output: v

It is a 25 bit register that stores the signal PRE_μ when the value of the signal CNT is equal to MAX. The signal START=1 sets the register to 1.

First array of adders and multiplexers SOM1:
inputs: CNT, v, N_BIT, MAX
output: R1

It is a cascade of a certain number, preferably 13, of 26 bit adders and multiplexers performing a number of steps of the Third Version of the Montgomery algorithm.

Each pair of an adder and a multiplexer MUX performs the operations of an IF . . . THEN cycle. For example, the first adder generates A+Y and the multiplexer MUX selects A+Y or A whether $x_0$ is 1 or 0, respectively. The successive adder generates W+K and the multiplexer selects W+K or W whether the least significant bit $w_0$ of W is 1 or 0, respectively. Finally, the operation A:=A/2 is performed simply by discarding the least significant bit $a_0$ of A. The variable Y and X are the factors CNT and v to be processed, while the variable K represents the maximum value MAX.

This block performs the first 6 iterations and the sum of the seventh iteration of the Third Version of the Montgomery algorithm, and outputs a signal R1 that represents the value W for i=6.

Register B1:
inputs: START, CNT, OUT_SELECT, R1, v, CLK, ENABLE_IN_W
outputs: CNT_P1, OUT_P1, R1_P1, v_P1

It is a buffer register that stores at each clock pulse the outputs of the blocks that precede in the cascade for providing them to the block that follows in the cascade at the successive clock pulse. The signal START sets to 2 the bits pertaining to CNT_P1, while the other bits are reset.

Second array of adders and multiplexers SOM2:
inputs: CNT_P1, R1_P1, v_P1, N_BIT, MAX
output: R2

It is practically identical with the first array of adders SOM1, but it calculates the value of A at the seventh iteration (i=6) and performs the iterations from the eighth (i=7) to the thirteenth (i=12). The output R2 represents the value A for i=12.

Third array of adders and multiplexers SOM3:
inputs: CNT_P2, R2_P2, v_P2, N_BIT, MAX
output: R3

It is practically identical with the first array of adders SOM1 but it performs the iterations from the fourteenth (i=13) to the nineteenth (i=18) and outputs the signal R3 that represents the value W for i=19.

Second register B2:
inputs: START, CNT_P1, OUT_P1, R2, v_P1, CLK, ENABLE_IN_W
outputs: CNT_P2, OUT_P2, R2_P2, v_P2

It is identical with the first register B1. The signal START sets to 1 the bits pertaining to CNT_P2, while the other bits are reset.

Third register B3:
inputs: START, CNT_P2, OUT_P2, R3, v_P2, CLK, ENABLE_IN_W
outputs: CNT_P3, OUT_P3, R3_P3, v_P3

It is identical with the first register B1.

The signal START resets the whole register.

Fourth array of adders and multiplexers SOM4:
inputs: CNT_P3, R3_P3, v_P3, N_BIT, MAX
output: IND_MS It is practically identical with the first array of adders SOM1 but it calculates the value of A at the twentieth iteration (i=19) and performs the iterations from the twenty-first (i=20) to the last (i=24). This block also comprises an adder that is enabled when the output value IND_MS exceeds the maximum value in order to subtract from it the value MAX when the result is greater than N*M−1. Finally, when CNT_P3 is equal to MAX, this block makes the output IND_MS equal to MAX, because the last address of every sequence must be the address N*M−1 of the last memory location.

Block WRITE_PIPELINE:
inputs: START, v, CNT, MAX, N_*BIT*, CLK, ENABLE_IN_W
outputs: IND_MS, CNT_P3, OUT_P3

It is a pipeline composed of the arrays of adders SOM1, SOM2, SOM3 and SOM4 and of the registers B1, B2, and B3. Given that the first series of write addresses corresponds to the succession (0, 1, . . . , N*M−1) output by the counter CNT_0_N*M−1, the registers B1, B2 and B3 are set for outputting this succession from the first clock pulse on the signal START. Doing so, the addressing circuit functions as if the pipeline had no latency time.

Register OUT_SELECT:
inputs: MAX, CNT, START, CLK
output: OUT_SELECT

It is a 1 bit register that is reset to 0 when the signal START is 1 and is set to 1 when the signal CNT is equal to MAX. This bit commands the output multiplexer MUX that generates the write address.

Multiplexer MUX:
inputs: CNT_P3, IND_MS, OUT_P3
output: ADDRESS_W

It is a multiplexer. When OUT_P3 is 0, the output is equal to CNT_P3 because the write address must be given by the natural succession generated by the counter, while when OUT_P3=1 the output is IND_MS.

Counter CNT2 0 . . . N*M−1:
inputs: CLK, MAX, START, ENABLE_IN_R
output: CNT2

It is a 25 bit counter from 0 to N*M−1. A positive edge on the signal START resets it to 0. When it reaches the value MAX, the counter resets.

Register v2 (s)
inputs: PRE_μ, MAX, CNT2, START
output: v2

It is a 25 bits register. When the signal START is 1, the register is set to 1, while it is loaded with the value of PRE_μ when CNT2=0.

Counter CNT LATENCE:
inputs: CLK, N, CNT, START
output: LAT

It is a 2 bits counter that is reset to 0 by the signal START. The output of the block is 0 when the counter is 0, while LAT is 1 when the counter is different from 0. When CNT=4*N (that is when CNT is equal to the bit representation of N shifted of two places on the left) and OUT=0, the counter is set to 3 and at each clock pulse CLK it is decremented to 0 and stops counting. To ensure the absence of output spikes on a leading edge of the clock, the output LAT is stored in a register that is updated on the trailing edge of the clock.

Block READ_PIPELINE:
inputs: START, v2, MAX, CNT2, N_BIT, CLK, ENABLE_IN_R
outputs: ADDRESS_R, CNT2_P3

It is a pipeline, similar to the block WRITE_PIPELINE, that generates read addresses by implementing the Montgomery algorithm. In this case, given that the initial sequence of read addresses is not a natural succession, in order to eliminate latency a logic signal LAT is provided that, during the initialization phase, makes the pipeline perform the necessary steps as soon as the inputs are ready.

Block CTRL BUFFER:
inputs: ENABLE_W, ENABLE_R, START, OUT_SELECT, CNT1_P3, CNT2_P3, CLK
outputs: ENABLE_IN_W, ENABLE_IN_R It is a circuit block formed by a combinatory portion and by a 1 bit register, used to signal when the buffer has been completely read but it has not been fully rewritten. In this situation it is necessary to suspend the read operation by switching down the signal ENABLE_IN_R as long as the buffer is not updated. When the buffer is full and the read operation is disabled (ENABLE_R=0), it is necessary to disable the write operation (ENABLE_IN_W=0) for not overwriting unread data. During the initial loading of the buffer, ENABLE_IN_R is low. When ENABLE_W or ENABLE_R are low, the signals ENABLE_IN_W and ENABLE_IN_R are low. In all other situations, the output enable signals are set to 1.

The algorithm starts setting to 1 the signal START. At the first leading edge of the clock signal all the registers are initialized and the registers N and M are respectively loaded with the value of N and M. After this edge, the signal START may be switched down. If it remains high for more than a clock period, the registers are reset at each leading edge. During this phase the signal ENABLE_W must be high, while the value of ENABLE_R is not relevant.

The loading phase of the buffer begins and at each clock pulse data of the first printer swath is loaded. The loading takes place through the succession output by the counter CNT_0 . . . N*M−1. The value 0 of the bit OUT_P3 makes the block WRITE_PIPELINE output the address ADDRESS_W equal to the value of the counter. At the same time the block GENERA_R²mod(N*M−1) generates the value necessary to the block PRE_COMP for generating the correct value for the next iteration. During this initial phase, ENABLE_IN_R is kept low and the block READ_PIPELINE is disabled.

To prevent the pipeline that generates read addresses from having latency times, during the first loading, the block CNT_LATENCE, when the inputs of the pipeline are ready, switches active the signal LAT for 3 clock periods. This allows the READ_PIPELINE to perform the first 3 steps and output the first useful address, thus eliminating latency times.

The first phase ends when CNT_0 . . . N*M−1 reaches the value MAX and OUT_SELECT becomes 1, and the sequence of write addresses is the sequence of addresses generated using the Montgomery algorithm. From this instant the address generation circuit is functioning in steady conditions.

When there are not any external disabling (which means that the signals ENABLE_W and ENABLE_R are always high) the outputs ADDRESS_R and ADDRESS_W are the equal: first stored data is read, then it is overwritten. Each time that CNT2_P3=N, the parameter μ(s+1) is loaded into the dedicated register and the block PRE_COMP generates the signal of PRE_μ that will be loaded in the register v(s) and v2(s) when the counters CNT_0_N*M−1 and CNT2_0_N*M−1 respectively reach the value N*M−1 and 0.

The externally driven signals ENABLE_W and ENABLE_R disable, when they are logically low, the generation of read and write addresses and make the signals ENABLE_IN_W and ENABLE_IN_R switch low, respectively. The block CTRL_BUFFER prevents the buffer from going to a critical functioning. When the memory buffer is full and it is not possible to read, the signal ENABLE_IN_W is switched low for disabling writing operations of the memory. When a full printer swath has been read but it has not been rewritten yet, or even when the memory buffer is free, the signal ENABLE_IN_R is switched low for disabling read operations.

To make the address generation circuit function correctly without latency times, it is necessary to satisfy the following constraints: the arrays of adders SOM1, SOM2, SOM3 and SOM4 and the multiplexer MUX are to generate a stable output in less than the clock period T; the circuit blocks R²mod(N*M−1) and PRE_COMP are to generate a stable signal PRE_μ in a time shorter than (N*M−1−N)*T; the signal MAX is to become stable in less than a clock period; and the signals generated by the block CNT_LATENCE is to become stable in less than half a clock period, because this circuit block is sensitive to both leading and trailing clock edges.

After the signal START is generated, the circuit block R²mod(N*M−1) requires 7 clock pulses for calculating the output, considering the case in which at least N_BIT=6, and another 4 clock pulses to be sure that the result of the preliminary computation is stable. Given that the block CNT_LATENCE performs the steps to eliminate the latency from the READ_PIPELINE after a time equal to 4*N*T from the signal START, it is assumed that 4 is the minimum value for N, so all the inputs of the pipeline are certainly stable.

FIGS. from 9 to 13 are timing diagrams illustrating certain functioning phases of the circuit of FIG. 5. Timing diagrams for the circuit of FIG. 4 are not shown for sake of brevity, but they could be immediately obtained from the diagrams of the circuit of FIG. 5.

Figure 9:
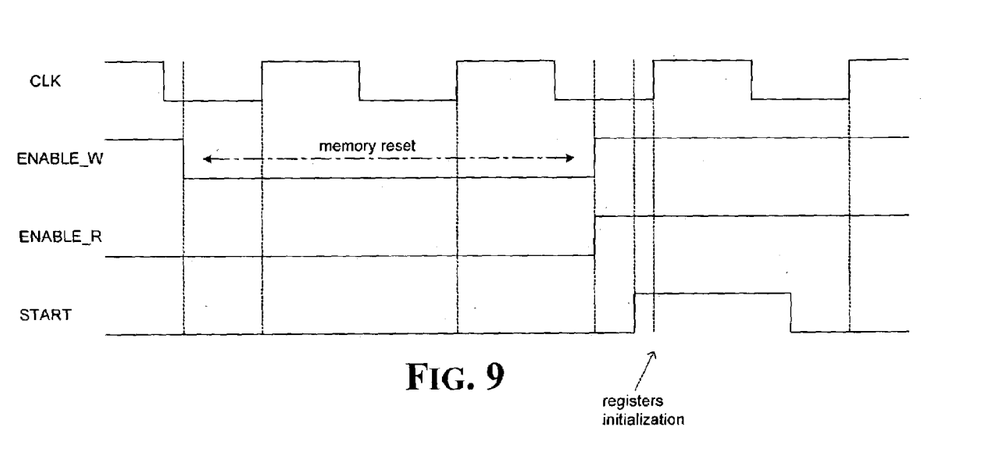
FIGS. 9 to 13 are time diagrams of various functioning phases of the circuit of FIG. 5.

The timing diagram of FIG. 9 depicts how a memory reset is performed by keeping low the signals ENABLE_W and ENABLE_R for a certain number of clock pulses, thus keeping in stand-by the address generation circuit. After the memory reset it is possible to switch active the enable signals and input the signal START for beginning the generation of addresses.

Figure 10:
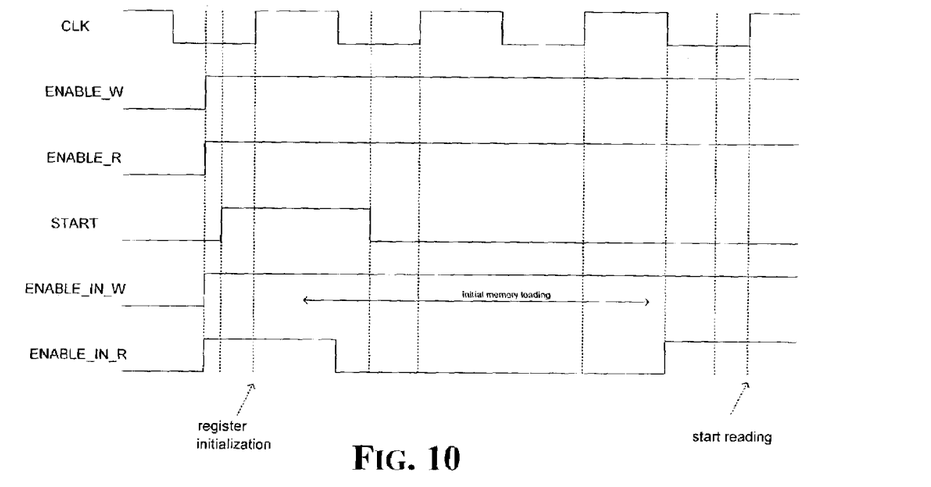

The initialization of registers is carried out as depicted in FIG. 10. The signals ENABLE_W and ENABLE_R are to be logically high on the clock edge in which START is high. For preventing a second initialization phase, the signals START are to be switched low before the successive edge. After the first loading of the buffer, the signal ENABLE_R may be indifferently high or low.

Figure 11:
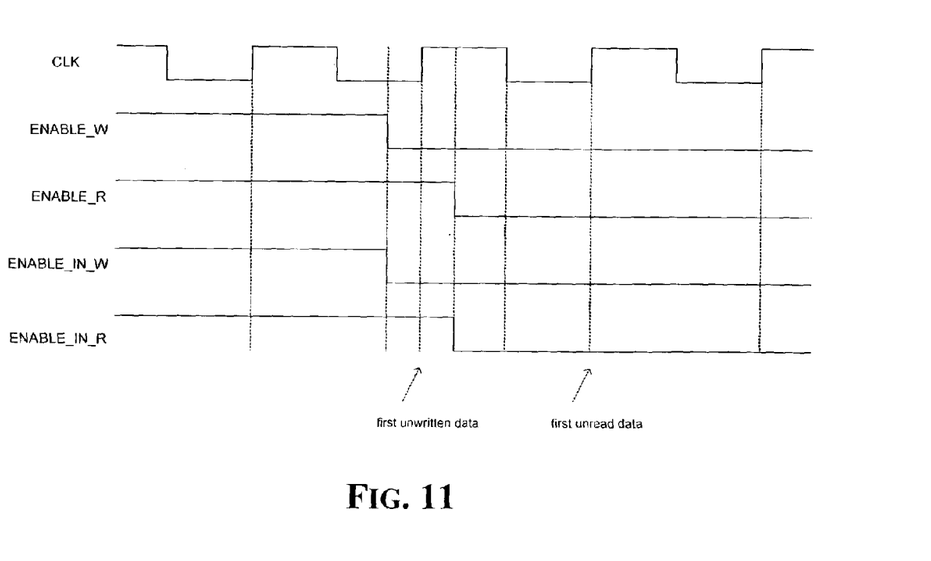

A disabling of the address generation circuit due to external signals is shown in FIG. 11. The signals ENABLE_W and ENABLE_R may be switched high or down one independently from the other. These signals make the signals ENABLE_IN_W and ENABLE_IN_R switch low.

Figure 12:
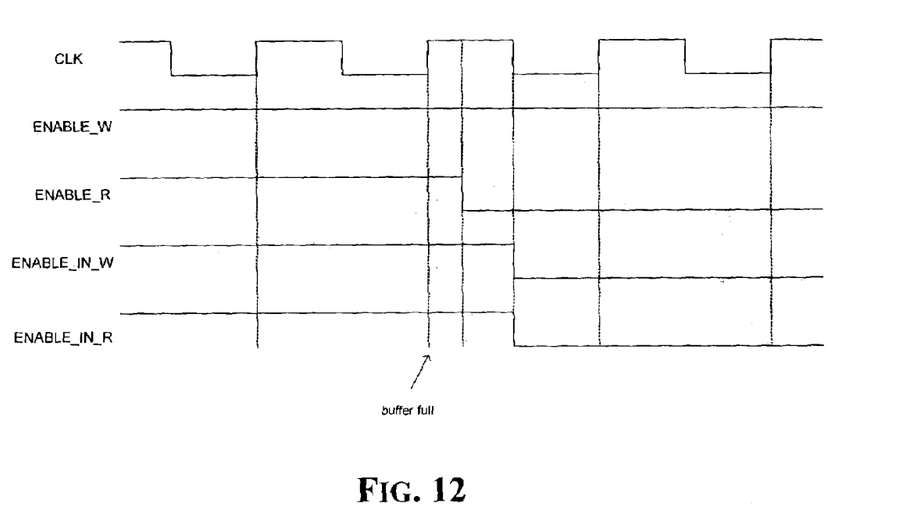
Figure 13:
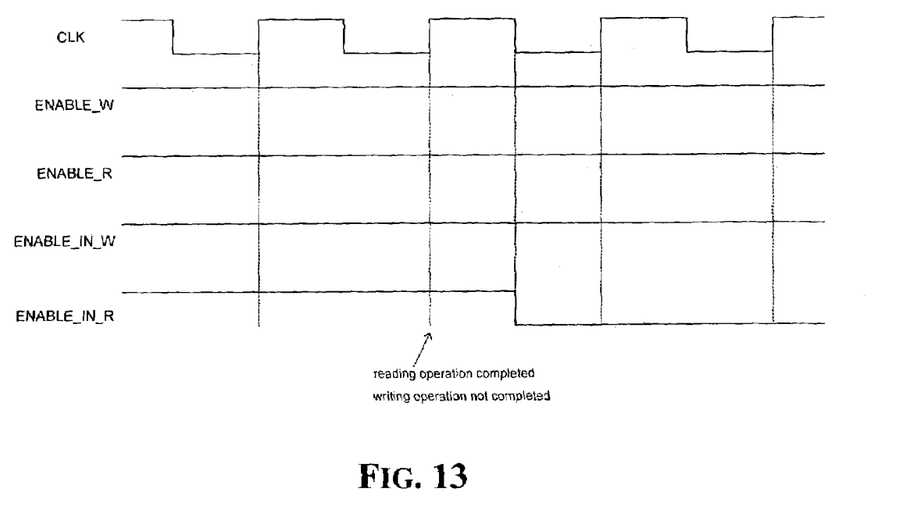

FIG. 12 shows signal waveforms when the memory buffer is full, and reading operations are disabled. To prevent data to be read from being overwritten, write operations are disabled. Finally, as shown in FIG. 13, when a printer swath has been fully read but the successive printer swath has not been completely rewritten, the reading phase is disabled waiting for the ending of the writing phase.

That which is claimed is:

1. A method for generating sequences of memory addresses for a memory buffer having N*M locations, the method comprising:
    making a first address and a last address of every sequence respectively equal to 0 and to N*M−1;
    assigning a first sequence of addresses;
    each address but the last address of another sequence of addresses being generated by multiplying a corresponding address of a previous sequence by N, and performing a modular reduction of this product with respect to N*M−1;
    calculating a greatest bit length of every address and calculating an auxiliary constant as the modular reduction with respect to N*M−1 of the power of two raised to twice the greatest bit length; and
    performing for each sequence of addresses the operations of
        storing an auxiliary parameter equal to an N+1$^{th}$ address of the current sequence,
        computing a first factor as the modular product with respect to N*M−1 of the auxiliary constant based upon a ratio between the auxiliary parameter and the power of two raised to the greatest bit length, and
        generating all addresses but the last of a sequence by performing the Montgomery algorithm using the first factor and an address index varying from 0 to N*M−2 as factors of the Montgomery algorithm, and with the quantity N*M−1 as modulus of the Montgomery algorithm, and the greatest bit length as the number of iterations of the Montgomery algorithm.

2. A method according to claim 1, wherein computing the first factor is performed with the Montgomery algorithm by using the auxiliary constant and the auxiliary parameter as factors of the Montgomery algorithm, and with the quantity N*M−1 as modulus of the Montgomery algorithm, and the greatest bit length as the number of iterations of the Montgomery algorithm.

3. A method according to claim 1, wherein the first sequence of addresses comprises a natural succession from 0 to N*M−1.

4. A method according to claim 1, wherein generating all the addresses is carried out through the following operations:
    assigning a null value to a first bit string;
    for each bit of the first factor starting from a least significant bit to a most significant bit, performing the following operations a) to c)
        a) calculating a second bit string as a sum of the first bit string and the address index, or as the first bit string whether the considered bit of the first factor is equal to 1 or is null, respectively,
        b) calculating a new value of the first bit string as the sum of the second bit string and a modulus of the Montgomery algorithm, or as the second bit string whether the least significant bit of the second bit string is equal to 1 or is null, respectively, and
        c) calculating a new value of the first bit string shifting right the first bit string and discarding the least significant bit thereof; and
    outputting the value of the first bit string minus N*M−1 or the value of the first bit string whether or not it exceeds N*M−1.

5. A method according to claim 1, wherein calculating the greatest bit length is carried out through the following operations:
    setting a first variable equal to the power of two raised to the greatest bit length; and
    performing iteratively the following operations a) to c) for a number of times equal to the greatest bit length
        a) calculating a difference value from the first variable and N*M−1,
        b) if the difference value is not negative, then setting the first variable equal to the difference value, and
        c) calculating a new value of the first variable by multiplying by two the current value thereof; and
    generating the auxiliary constant equal to the value of the first variable.

6. An address generating circuit for a memory buffer having N*M locations and comprising:
    first circuit means for generating a pre-established initial sequence of addresses;
    second circuit means being input with a signal representing a value N*M−1, and outputting a first signal representing a greatest bit length of every address, and a second signal representing an auxiliary constant as a modular reduction with respect to N*M−1 of the power of two raised to twice the greatest bit length;
    a counter being input with the signal representing the value N*M−1, and counting pulses of a clock signal until the value N*M−1 is reached;
    a register being input with the value of the counter and with a signal representing a generated address, said register storing for each sequence a respective value equal to an N+1$^{th}$ address of a current sequence;
    third circuit means input with the second signal, the signal output by said register and a signal representing the value N*M−1, and generating a third signal representing a modular product with respect to N*M−1 of the auxiliary constant by a ratio between the value (N*M−1) and the power of two raised to the greatest bit length; and fourth circuit means being input with the third signal, a value of said counter, the signal representing the value N*M−1 and the first signal, and generating signals representing a desired sequence of addresses according to the Montgomery algorithm using the value of said counter and the value of the third signal as factors of the algorithm, and the greatest bit length represented by the first signal as the number of iterations of the algorithm.

7. An address generating circuit according to claim 6, wherein said fourth circuit means comprise a plurality of adders and multiplexers connected together in cascade for carrying out iterative sums contemplated by the Montgomery algorithm according to the following operations:

assigning a null value to a first bit string;

for each bit of the first factor starting from a least significant bit to a most significant bit, performing the following operations a) to c)

a) calculating a second bit string as a sum of the first bit string and the address index, or as the first bit string whether the considered bit of the first factor is equal to 1 or is null, respectively, b) calculating a new value of the first bit string as the sum of the second bit string and a modulus of the Montgomery algorithm, or as the second bit string whether the least significant bit of the second bit string is equal to 1 or is null, respectively, and c) calculating a new value of the first bit string shifting right the first bit string and discarding the least significant bit thereof; and outputting the value of the first bit string minus N*M−1 or the value of the first bit string whether or not it exceeds N*M−1.

8. An address generating circuit according to claim 6, further comprising a second counter being input with the signal representing the value N*M−1, and counting pulses of another clock signal of the circuit until the value N*M−1 is reached; and fifth circuit means being input with the third signal, the value of the second counter, the signal representing the value N*M−1 and the first signal, and generating signals representing a desired sequence of memory addresses in which to read according to the Montgomery algorithm, using the value of said first counter and the value of said third signal as factors of the algorithm, and the greatest bit length represented by the first signal as the number of iterations of the Montgomery algorithm;

said fourth circuit means generating sequences of memory addresses in which to write.

9. An address generating circuit according to claim 6, wherein said second circuit means comprises a state machine for performing the following steps for calculating the greatest bit length:

setting a first variable equal to the power of two raised to the greatest bit length; and performing iteratively the following operations a) to c) for a number of times equal to the greatest bit length a) calculating a difference value from the first variable and N*M−1, b) if the difference value is not negative, then setting the first variable equal to the difference value, and c) calculating a new value of the first variable by multiplying by two the current value thereof; and generating the auxiliary constant equal to the value of the first variable.

10. A swath buffer interface comprising:

a memory buffer organized in a matrix having N rows and M columns, and being input with a sequence of data to be output in a certain order; and an address generating circuit for locations of output data to be read from said memory buffer and addresses of input data to be written in said memory buffer, said address generating circuit comprising a counter for generating a pre-established initial sequence of addresses, a second circuit being input with a signal representing a value N*M−1, and outputting a first signal representing a greatest bit length of every address, and a second signal representing an auxiliary constant as a modular reduction with respect to N*M−1 of the power of two raised to twice the greatest bit length;

said counter being input with the signal representing the value N*M−1, and counting pulses of a clock signal until the value N*M−1 is reached, a register being input with the value of the counter and with a signal representing a generated address, said register storing for each sequence a respective value equal to an $N+1^{th}$ address of a current sequence, a third circuit input with the second signal, the signal output by said register and a signal representing the value N*M−1, and generating a third signal representing a modular product with respect to N*M−1 of the auxiliary constant by a ratio between the value and the power of two raised to the greatest bit length, and a fourth circuit being input with the third signal, a value of said counter, the signal representing the value N*M−1 and the first signal, and generating signals representing a desired sequence of addresses according to the Montgomery algorithm using the value of said counter and the value of the third signal as factors of the algorithm, and the greatest bit length represented by the first signal as the number of iterations of the algorithm.

11. A swath buffer interface according to claim 10, wherein said fourth circuit comprise a plurality of adders and multiplexers connected together in cascade for carrying out iterative sums contemplated by the Montgomery algorithm according to the following operations:

assigning a null value to a first bit string;

for each bit of the first factor starting from a least significant bit to a most significant bit, performing the following operations a) to c)

a) calculating a second bit string as a sum of the first bit string and the address index, or as the first bit string whether the considered bit of the first factor is equal to 1 or is null, respectively, b) calculating a new value of the first bit string as the sum of the second bit string and a modulus of the Montgomery algorithm, or as the second bit string whether the least significant bit of the second bit string is equal to 1 or is null, respectively, and c) calculating a new value of the first bit string shifting right the first bit string and discarding the least significant bit thereof; and outputting the value of the first bit string minus N*M−1 or the value of the first bit string whether or not it exceeds N*M−1.

12. A swath buffer interface according to claim 10, further comprising

- a second counter being input with the signal representing the value N*M−1, and counting pulses of another clock signal of the circuit until the value N*M−1 is reached; and
- a fifth circuit being input with the third signal, the value of the second counter, the signal representing the value N*M−1 and the first signal, and generating signals representing a desired sequence of memory addresses in which to read according to the Montgomery algorithm, using the value of said first counter and the value of said third signal as factors of the algorithm, and the greatest bit length represented by the first signal as the number of iterations of the Montgomery algorithm;
- said fourth circuit generating sequences of memory addresses in which to write.

13. A swath buffer interface according to claim 10, wherein said second circuit comprises a state machine for performing the following steps for calculating the greatest bit length:

- setting a first variable equal to the power of two raised to the greatest bit length; and
- performing iteratively the following operations a) to c) for a number of times equal to the greatest bit length
    - a) calculating a difference value from the first variable and N*M−1,
    - b) if the difference value is not negative, setting the first variable equal to the difference value, and
    - c) calculating a new value of the first variable by multiplying by two the current value thereof; and
- generating the auxiliary constant equal to the value of the first variable.

* * * * *

UNITED STATES PATENT AND TRADEMARK OFFICE
CERTIFICATE OF CORRECTION

PATENT NO. : 7,058,787 B2 Page 1 of 1
APPLICATION NO. : 10/429942
DATED : June 6, 2006
INVENTOR(S) : Brognara et al.

It is certified that error appears in the above-identified patent and that said Letters Patent is hereby corrected as shown below:

Column 2, Line 4  Delete: "T2"
Insert: -- I2 --

Column 3, Line 9  Delete: "by a for"
Insert: -- by --

Column 3, Line 14  Delete "addresses Each"
Insert: -- addresses. Each --

Column 4, Line 43  Delete: "$X^1X_0$"
Insert: -- $X_1X_0$ --

Column 5, Line 52  Delete: "understanding the"
Insert: -- understanding of the --

Signed and Sealed this

Thirteenth Day of February, 2007

JON W. DUDAS
*Director of the United States Patent and Trademark Office*